United States Patent [19]

Sagawa

[11] 3,932,755

[45] Jan. 13, 1976

[54] DEVICE FOR DETECTING DOUBLE SHEET FEEDING

[75] Inventor: Takizo Sagawa, Ebina, Japan

[73] Assignee: Rank Xerox Ltd., London, England

[22] Filed: Aug. 9, 1974

[21] Appl. No.: 495,969

[52] U.S. Cl. .................................. 250/349; 250/559

[51] Int. Cl.[2] ............................................ G01J 1/00

[58] Field of Search ........... 250/338, 349, 340, 341, 250/214 R, 223 R, 559; 356/161

[56] References Cited

UNITED STATES PATENTS

| | | | |
|---|---|---|---|
| 2,517,330 | 8/1950 | Marenholtz | 356/161 X |
| 3,026,419 | 3/1962 | Aweida et al. | 250/214 R X |
| 3,278,754 | 10/1966 | Wallace | 250/223 R |

*Primary Examiner*—Davis L. Willis

[57] ABSTRACT

An apparatus for detecting the feeding of piled sheets along a sheet feeding path. The apparatus includes a first reflection plate of high reflectivity and a second reflection plate of low reflectivity. Means are provided for irradiating each of the plates with radiant rays. Means are provided for detecting the quantity of radiant rays reflected from each of the plates. Means are coupled to the detecting means for generating a signal indicating piled sheets being fed when the difference between the quantity of reflective rays from the first plate and the quantity of reflective rays from the second plate are below a predetermined level.

4 Claims, 1 Drawing Figure

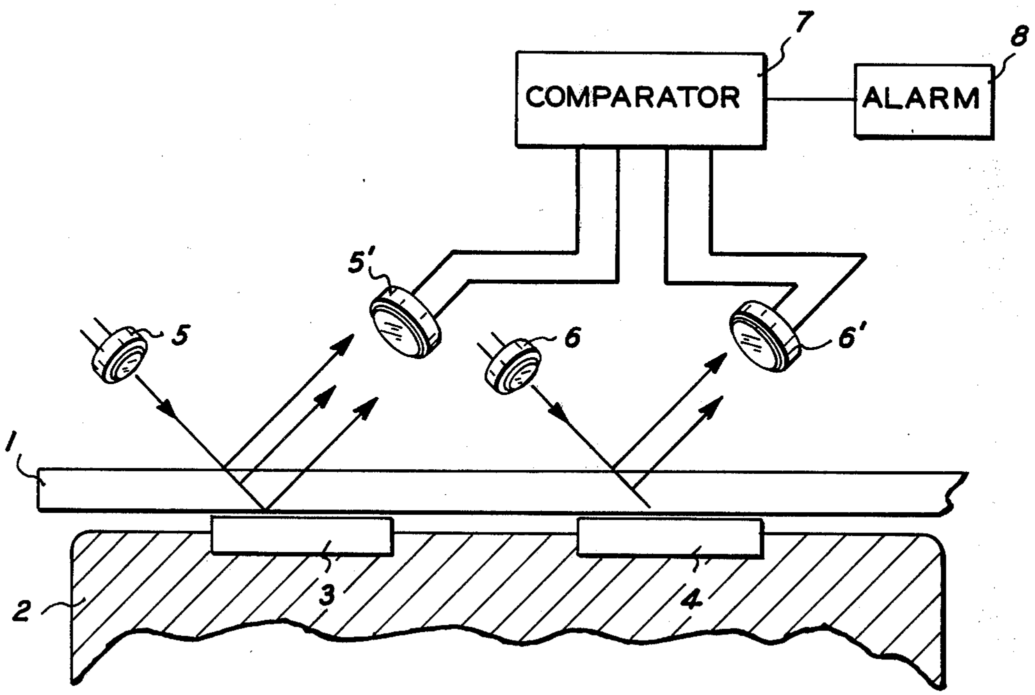
7
8
COMPARATOR
ALARM
5'
5
6
6'
1
2
3
4

DEVICE FOR DETECTING DOUBLE SHEET FEEDING

The present invention relates to an apparatus for detecting piled sheets which are being fed for use in a printing machine, duplicating machine, or the like. Heretofore, double sheet detectors and devices for detecting the thickness of paper sheets mechanically or from the change in the quantity of transmitted or reflected light have been used. There are drawbacks, however, to those devices as they are required to be adjusted very carefully to match them to the thickness of the paper to be used or the color of the paper to be used. Moreover, their operation is not necessarily accurate and readjustment may be required each time the sheets of paper are changed.

An example of a prior art double sheet detection system is set forth in U.S. Pat. No. 3,278,754. This patent is believed to be representative of the broad prior art involving the use of photosensitive double sheet detectors. The detector disclosed therein employs an optical assembly including a lamp as a source of light and a solar cell responsive to reflected light for generating a variable current which is proportional to the distance of the sheet from the detector. Fiber optic bundles communicating with the light source and the detector are separated from the vertical by a specific angle which determines the distance of an object from the detector at which the maximum current is obtained from the assembly. A variable threshold amplifier is preset to turn on in response to a predetermined current corresponding to a detection range. Preferably, a pair of detector assemblies positioned on opposite sides of a feed channel and a control circuit responsive to the output signals of the detector assemblies is employed. The operation of this type of detector is extremely sensitive to the distance of the sheet from the detector. This distance being utilized for generating the different levels of output signals for distinguishing between a single sheet being fed and a double sheet being fed. Therefore, as previously described, the detector must be positioned with a high degree of accuracy in order for it to properly operate, and it may need to be repositioned for different thicknesses of documents being employed.

It is an object of this invention to provide an improved double sheet or piled sheet detector which does not suffer from the aforementioned drawbacks.

In accordance with the present invention an apparatus for detecting the feeding of piled sheets along a sheet feeding path is provided. The apparatus includes a first reflecting plate positioned in the sheet feed path wherein the first plate has a high reflectivity. The first plate can be formed of a material such as white art paper and is used as a standard. A second reflecting plate positioned in the sheet feed path is provided having a low reflectivity. A suitable material for the second plate would comprise light shielding paper, such as black paper. Means are provided for irradiating each of the plates with radiant rays. The radiant ray could comprise an infrared ray. Means are also provided for detecting the quantity of radiant rays reflected from each of the plates as a sheet passes over them. Means coupled to the detecting means are provided for generating a signal indicating a piled sheet condition when the difference between the quantity of reflected rays from the high reflectivity plate and the quantity of reflected rays from the low reflectivity plate is below a predetermined level. When paper passes between the detecting means and the plates the quantity of reflected rays from each of the reflecting plates is greatly different when a single sheet is being fed, but there is little difference in the quantity of the reflected rays from each of the plates when piled sheets are being fed.

The FIGURE is a schematic illustration of one embodiment in accordance with the present invention.

Referring now to the FIGURE, a sheet 1, for example of paper, is shown passing over the high reflectivity plate 3 and the low reflectivity plate 4 positioned in the sheet feed path 2. In the embodiment shown the high reflectivity plate 3 comprises white art paper and the low reflectivity plate 4 comprises a light shielding paper. Luminous diodes 5 and 6 are provided to irradiate the reflecting plates through the paper sheet 1, and comprise the source of radiant rays. Luminous diodes having a peak wave length of 940 millimicrons could be used. The detecting means comprises photocells 5', 6', the difference in the output from the photocells is provided as a signal by any desired circuit 7. For example, one could employ a conventional threshold comparator circuit. The particular type of circuit employed does not form a part of the present invention. When the level of the signal falls below a predetermined trigger level an alarm 8 for piled sheet feeding is sounded by employing a suitable conventional circuit, for example, a trigger circuit. It should also be apparent to those skilled in the art that a circuit similar to that described with reference to FIG. 5 of the above-noted U.S. Pat. No. 3,278,754 could be employed with the detectors 5' and 6' of this invention.

Detection of piled or double fed sheets can be readily obtained with the apparatus of the present invention. The apparatus of the present invention utilizing as it does the reflected rays from the reflection plates 3 and 4 positioned behind the sheet 1 and utilizing two detectors 5' and 6' eliminates the influence of sheet thickness or sheet color. Also, as compared to conventional systems the effects of the mounting position of the light receiving elements 5' and 6' is diminished while still allowing the use of small sized detectors.

U.S. Pat. No. 3,278,754 is intended to be incorporated by reference into the description of this application.

It is apparent that there has been provided in accordance with this invention, a device for detecting double sheet feeding which fully satisfies the objects, means and advantages set forth hereinbefore. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. An apparatus for detecting the feeding of piled sheets along a sheet feed path comprising:

a first reflection plate positioned in said sheet feed path, said first plate having a high reflectivity;

a second reflection plate positioned in said sheet feed path, said second plate having a low reflectivity as compared to said first plate;

means for irradiating each of said plates with infrared rays, said irradiating means being positioned to irradiate said plates through said sheets;

means for detecting the quantity of infrared rays reflected from each of said plates; and means coupled to said detecting means for generating a signal indicating piled sheets being fed when the difference between the quantity of reflected rays from said first plate and the quantity of reflected rays from said second plate is below a predetermined level.

2. An apparatus as in claim 1 wherein said irradiating means comprise luminous diodes and wherein said detecting means comprise photocells.

3. An apparatus as in claim 2 wherein said first plate comprises white paper and wherein said second plate comprises black paper.

4. An apparatus as in claim 3 wherein said diodes have a peak wavelength of 940 millimicrons.

* * * * *